United States Patent
Narayanan et al.

(10) Patent No.: US 9,641,428 B2
(45) Date of Patent: *May 2, 2017

(54) SYSTEM AND METHOD FOR PAGING FLOW ENTRIES IN A FLOW-BASED SWITCHING DEVICE

(71) Applicant: Dell Products, LP, Round Rock, TX (US)

(72) Inventors: Rajesh Narayanan, San Jose, CA (US); Saikrishna M. Kotha, San Jose, CA (US)

(73) Assignee: Dell Products, LP, Round Rock, TX (US)

(*) Notice: Subject to any disclaimer, the term of this patent is extended or adjusted under 35 U.S.C. 154(b) by 124 days.

This patent is subject to a terminal disclaimer.

(21) Appl. No.: 13/850,004

(22) Filed: Mar. 25, 2013

(65) Prior Publication Data
US 2014/0286336 A1 Sep. 25, 2014

(51) Int. Cl.
H04L 12/26 (2006.01)
H04L 12/721 (2013.01)
H04L 12/933 (2013.01)
H04L 12/947 (2013.01)
H04L 12/931 (2013.01)

(52) U.S. Cl.
CPC ............ *H04L 45/38* (2013.01); *H04L 49/109* (2013.01); *H04L 49/25* (2013.01); *H04L 49/70* (2013.01)

(58) Field of Classification Search
CPC ................................ H04L 49/70; H04L 45/38
USPC ........................................................ 370/235
See application file for complete search history.

(56) References Cited

U.S. PATENT DOCUMENTS

| | | | |
|---|---|---|---|
| 8,300,532 B1* | 10/2012 | Venkatramani | H04L 45/306 370/235 |
| 2005/0152284 A1 | 7/2005 | Kotha et al. | |
| 2006/0112219 A1 | 5/2006 | Chawla et al. | |
| 2007/0266110 A1 | 11/2007 | Chawla et al. | |
| 2008/0040376 A1 | 2/2008 | Reeves et al. | |
| 2008/0288664 A1 | 11/2008 | Pettey et al. | |
| 2008/0291923 A1* | 11/2008 | Back et al. | 370/396 |
| 2009/0049160 A1 | 2/2009 | Cherian et al. | |
| 2009/0112877 A1 | 4/2009 | Cherian et al. | |

(Continued)

OTHER PUBLICATIONS

"Split Plane Architecture, Building the Next-Generation Packet Infrastructure," © 2000 Network Equipment Technologies, Inc., 2000 http://www.at2.com/downloads/documents/all_others/net_splitplane_architecture_wp.pdf.

(Continued)

*Primary Examiner* — Mark Rinehart
*Assistant Examiner* — Matthew Hopkins
(74) *Attorney, Agent, or Firm* — Larson Newman, LLP

(57) ABSTRACT

A network switching device includes a macroflow sub-plane that performs packet-based routing in the network switching device and a microflow routing sub-plane that performs flow-based routing in the network switching device. The microflow routing sub-plane receives a first data packet, determines that the first data packet is associated with a first flow page, wherein the first flow page comprises a plurality of flow entries, determines that the first flow page is not resident in a routing table of the microflow routing sub-plane, and requests the first flow page from a software defined network (SDN) controller.

20 Claims, 4 Drawing Sheets

(56) References Cited

U.S. PATENT DOCUMENTS

| | | | |
|---|---|---|---|
| 2009/0144463 | A1 | 6/2009 | Cherian et al. |
| 2009/0164769 | A1 | 6/2009 | Cherian et al. |
| 2009/0165097 | A1 | 6/2009 | Cherian et al. |
| 2009/0232137 | A1 | 9/2009 | Cherian et al. |
| 2009/0327675 | A1 | 12/2009 | Cherian et al. |
| 2010/0057908 | A1 | 3/2010 | Smith et al. |
| 2010/0077066 | A1 | 3/2010 | Chawla et al. |
| 2010/0138642 | A1 | 6/2010 | Cherian et al. |
| 2010/0146039 | A1 | 6/2010 | Lo et al. |
| 2010/0165877 | A1 | 7/2010 | Shukla et al. |
| 2010/0180274 | A1 | 7/2010 | Cherian et al. |
| 2011/0051602 | A1* | 3/2011 | Matthews et al. ............ 370/235 |
| 2012/0042095 | A1 | 2/2012 | Kotha et al. |
| 2013/0128746 | A1* | 5/2013 | Yedavalli ..................... 370/238 |
| 2014/0075557 | A1* | 3/2014 | Balabine ................ H04L 63/20 726/23 |

OTHER PUBLICATIONS

"OpenFlow: Enabling Innovation in Campus Networks," McKeown et al., Mar. 14, 2008 http://www.openflowswitch.org.

"SPARC—Split Architecture Introduction," Andreas Gladisch, Deutsche Telekom AG, T-Labs, SPARC Introduction, Brussels Concertation Meeting, Oct. 2010 http://cordis.europa.eu/fp7/ict/future-networks/documents/projects-sparc-presentation_en.pdf.

* cited by examiner

SYSTEM AND METHOD FOR PAGING FLOW ENTRIES IN A FLOW-BASED SWITCHING DEVICE

FIELD OF THE DISCLOSURE

The present disclosure generally relates to information handling systems, and more particularly relates to paging flow entries in a flow-based switching device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
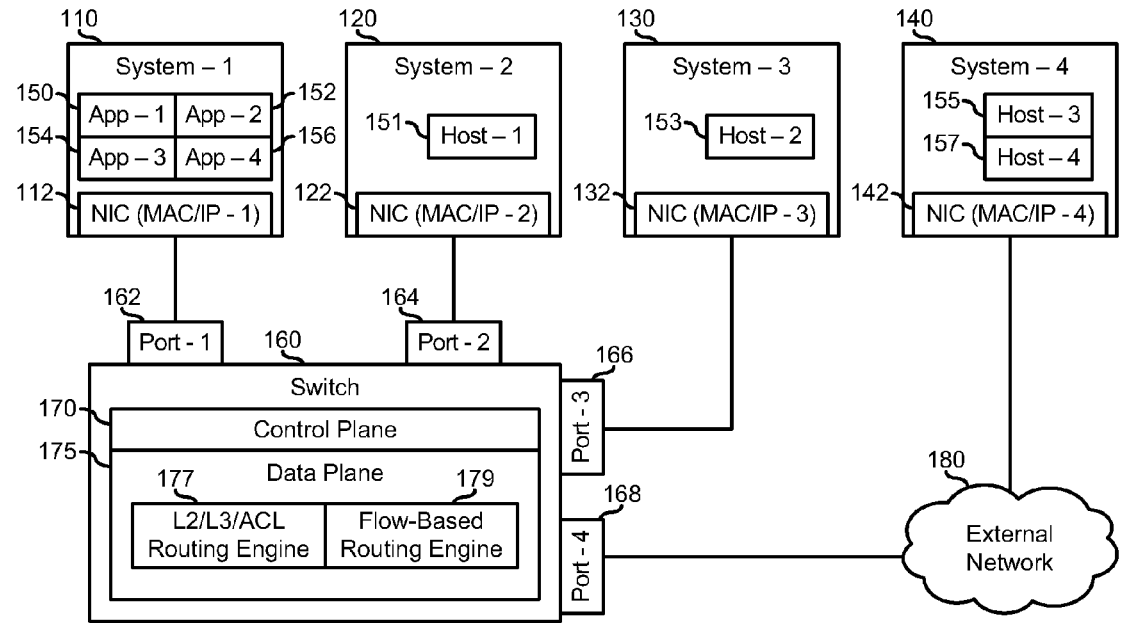
FIG. 1 is a block diagram of a network according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Network 100 includes networked systems 110, 120, 130, and 140, a flow-based switching device 160, and an external network 180. Systems 110, 120, 130, and 140 represent a variety of computing resources of network 100 including client information handling systems, data processing servers, network storage devices, local and wide area networks, or other resources as needed or desired. System 110 includes a network interface card (NIC) 112, system 120 includes a NIC 122, system 130 includes a NIC 132, and system 140 includes a NIC 142. NICs 112, 122, 132, and 142 represent network adapters that are operable to provide a data interface to transmit and receive data between the respective systems 110, 120, 130, and 140. As such, NICs 112, 122, 132, and 142 can represent add-in cards, network interfaces that are integrated with a main board of respective systems 110, 120, 130, and 140, another network interface capability, or a combination thereof. Each of NICs 112, 122, 132, and 142 are uniquely identified on network 100 via one or more unique identifiers. For example, NICs 112, 122, 132, and 142 can each be identified by one or more of a media access control (MAC) address, an Internet protocol (IP) address, a world wide name (WWN), or another unique identifier, as needed or desired.

Systems 110, 120, 130, and 140 are adapted to run one or more applications 150, 152, 154, and 156, or to run associated host applications 151, 153, 155, and 157. Thus, as illustrated, system 110 runs applications 150, 152, 154, and 156, system 120 runs host application 151 that is associated with application 150, system 130 runs host application 153 that is associated with application 152, and system 140 runs host application 155 that is associated with application 154 and host application 157 that is associated with application 156. For example, application 150 can represent an electronic mail client application that is associated with host application 151 that represents an electronic mail server, application 152 can represent a data storage client application that is associated with host application 153 that represents a data storage server, application 154 can represent a web browser application that is requesting web data from host application 155 that represents a hosted website, and application 156 can represent streaming multimedia content that is associated with host application 157 that represents a streaming multimedia server.

Flow-based switching device 160 includes ports 162, 164, 166, and 168. Switching device 160 operates to route data packets between ports 162, 164, 166, and 168. As such, switching device 160 receives data packets from ports 162, 164, 166, and 168, determines the destination for the data packets, and sends the data packets to the port that is associated with the destination. Port 162 is connected to NIC 112, port 164 is connected to NIC 122, port 166 is connected to NIC 132, and port 168 is connected via external network 180 to NIC 142. As such, data packets received from system 110 on port 162 will be directed to port 164, 166, or 168, based upon whether the data packets are destined for system 120, 130, or 140. Data packets from systems 120, 130, and 140 will similarly be directed to appropriate port 162, 164, 166, or 168.

Switching device 160 includes a control plane 170 and a data plane 175. Control plane 170 represents a central processing unit (CPU) complex and operates to provide network discovery, mapping, and management based upon various protocols, and provides for differentiated service within switching device 160. For example, control plane 170 can perform network discovery and mapping based upon a shortest path first (SPF) or open shortest path first (OSPF) protocol, a peer-to-peer protocol (PPP), a neighbor discovery protocol (NDP), a border gateway protocol (BGP), or another network mapping and discovery protocol. Control plane 170 can also provide network management based upon a simple network management protocol (SNMP), a trivial file transfer protocol (TFTP), a Telnet session, or another network management protocol.

Data plane 175 performs the routing functions of switching device 160 by receiving data packets from ports 162, 164, 166, and 168, determining the destination for the data packets, and sending the data packets to the port that is associated with the destination. The routing functions can be packet-based or flow-based. As such, data plane 175 includes a packet-based routing engine 177 and a flow-based routing engine 179. Packet-based routing engine 177 provides for routing behavior that is determined based upon the port that receives the data packets and a determination of the port to which the data packets are to be forwarded. For example, packet-based routing engine 177 can provide for routing based upon the Open Systems Interconnect (OSI) model for layer 2 and layer 3 data packet routing. Here, packet-based information is determined based upon header information of the data packets. For example, the header information can include a source MAC address, a source IP address, a destination MAC address, a destination IP address, another type of data packet header information, or a combination thereof. As such, packet-based routing engine 177 can include a routing table that associates certain destination addresses with the respective ports 162, 164, 166, and 168 that are used to forward the data packets.

TABLE 1

Packet-Based Routing Table

| Port Number | MAC Address | IP Address |
|---|---|---|
| 1 | 12:34:56:78:9a:bc | 000.111.001 |
| 2 | de:f0:12:34:56:78 | 000.111.002 |
| 3 | ab:12:cd:34:ef:56 | 000.111.003 |
| 4 | — | All Other |

Table 1 illustrates an example of a packet-based routing table for network 100. Here NIC 112 has a MAC address of 12:34:56:78:9a:bc, and an IP address of 000.111.001, NIC 122 has a MAC address of de:f0:12:34:56:78, and an IP address of 000.111.002, and NIC 132 has a MAC address of ab:12:cd:34:ef:56, and an IP address of 000.111.003. As such, data packets received by switching device 160 on ports 164, 166, or 168, and that have header information that includes the MAC address or the IP address for NIC 112, will be routed to port 162. Similarly, data packets received that have header information that matches the MAC address or the IP address for NICs 122 and 132 will be routed to ports 164 and 166, respectively. In a particular embodiment, packet-based routing engine 177 provides for routing behavior that is determined based upon other packet-based rules, such as those determined by an access control list (ACL), a firewall, a filter, another packet-based rule, or a combination thereof. In another embodiment, the packet-based routing table includes other fields for layer 2, layer 3, and ACL routing, as needed or desired.

Flow-based routing engine 179 provides for routing behavior that is determined based upon the particular flow of information with which the data packets are associated. A flow is a sequence of data packets sent from a particular source to a particular unicast, anycast, or multicast destination that the source desires to label as a flow, and can consist of all data packets in a specific transport connection or media stream. For example, a flow can be associated with a particular application, a user, a media stream, another flow identifier, or a combination thereof, as needed or desired. Flow-based routing engine 179 performs deep packet inspection to determine whether or not data packets received from servers 110, 120, 130, or 140 are associated with a flow. As such, flow-based routing engine 179 can include flow routing rules, a flow routing table, other flow control mechanisms, or a combination thereof, in order to ascertain that a certain data packet is associated with a flow, and to thereby determine a port 162, 164, 166, or 168 to which to forward the data packets.

TABLE 2

Flow-Based Routing Table

| Port Number | MAC Address | IP Address | Application | Destination | User | Flow ID |
|---|---|---|---|---|---|---|
| 1 | 12:34:56:78:9a:bc | 000.111.001 | App. - 1 | Port 2 | 1 | 1 |
|  |  |  |  |  | 2 | 2 |
|  |  |  | App. - 2 | Port 3 | — | 3 |
|  |  |  | App. - 3 | Port 4 | — | 4 |
|  |  |  | App. - 4 | Port 4 | — | 5 |

TABLE 2-continued

Flow-Based Routing Table

| Port Number | MAC Address | IP Address | Application | Destination | User | Flow ID |
|---|---|---|---|---|---|---|
| 2 | de:f0:12:34:56:78 | 000.111.002 | Host App. - 1 | Port 1 | 1 | 6 |
|  |  |  |  |  | 2 | 7 |
| 3 | ab:12:cd:34:ef:56 | 000.111.003 | Host App. - 2 | Port 1 | All | 8 |
| 4 | — | All Other | Host App. - 3 | Port 1 | All | 9 |
|  |  |  | Host App. - 4 | Port 1 | 1 | 10 |
|  |  |  |  |  | 2 | 11 |

Table 2 illustrates an example of a flow-based routing table for network 100. Here in addition to the MAC address and IP address routing associations, the table includes each identified flow, and the associated egress port, application, and user. Here, when a deep packet inspection of the data packets indicates that the data packets are associated with one of the identified flows, the data packet is routed to the associated port 162, 164, 166, or 168. For example, if a data packet is identified as being a data packet associated with an e-mail from a first user that is being sent to an e-mail server, then the data packet will be routed to the host e-mail server 151 on system 120. When host e-mail server 151 provides data packets back to the first user, the deep packet inspection of the data packet will reveal that the data packet is associated with flow-6, and the data packet will be routed via port 162 to e-mail application 150 on server 110. In a particular embodiment, flow-based routing engine 179 provides for routing behavior that is determined based upon other packet information, such as those determined by tuple inspection of the data packets, another flow-based rule, or a combination thereof. In another embodiment, the flow-based routing table includes other fields for flow-based routing, as needed or desired.

Figure 2:
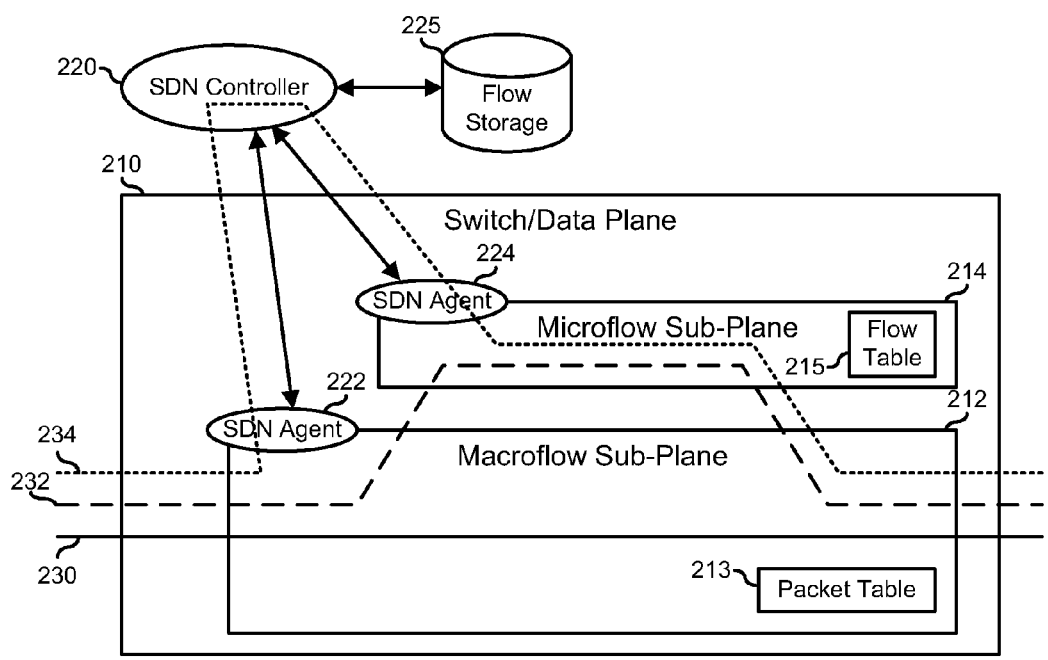
FIG. 2 is a block diagram of a flow-based switching device according to an embodiment of the present disclosure.

FIG. 2 illustrates a network 200 similar to network 100, including a flow-based switching device 210 connected to a software defined network (SDN) controller 220. Switching device 210 is similar to switching device 160, and has a split data plane including a macroflow sub-plane 212 and a microflow sub-plane 214. Macroflow sub-plane 212 operates similarly to packet-based routing engine 177, and microflow sub-plane 214 operates similarly to flow-based routing engine 179. Macroflow sub-plane 212 represents an application specific integrated circuit (ASIC) that is suitable to receive data packets on a port of switching device 210, and to quickly make routing decisions for the data packets using packet-based routing techniques as described above. For example, macroflow sub-plane 212 can be implemented via readily available, low cost, commercial ASIC product that is adapted to provide efficient packet based routing.

Microflow sub-plane 214 represents a processing capability of switching device 210 that is suitable to receive data packets on a port of switching device 210, and to quickly make routing decisions for the data packets using flow-based routing techniques as described above. For example, microflow sub-plane 214 can be implemented as a multi-core processing complex that is able to rapidly make multiple processor-intensive flow-based routing decisions. The split data plane thus provides an adaptable, scalable solution to increased flow-based traffic on network 200.

SDN controller 220 provides visibility into the switching paths of the network traffic through macroflow sub-plane 212 and microflow sub-plane 214, and permits the switching paths to be modified and controlled remotely. For example, SDN controller 220 can provide visibility into the switching paths of the network traffic through macroflow sub-plane 212 by reading, writing, modifying, or updating a packet-based routing table 213 similar to Table 1, above, that is associated with the macroflow sub-plane. Similarly, SDN controller 220 can provide visibility into the switching paths of the network traffic through microflow sub-plane 214 by reading, writing, modifying, or updating a flow-based routing table 215 similar to Table 2, above, that is associated with the microflow sub-plane. SDN controller 220 establishes a link with macroflow sub-plane 212 via an SDN agent 222 that operates on switching device 210, and establishes a link with microflow sub-plane 214 via an SDN agent 224 that operates on the switching device. SDN agents 222 and 224 permit secure communications between the SDN controller 210 and sub-planes 212 and 214. An example of an SDN includes a network that is controlled by an Open-Flow protocol, or another flow-based switching network instantiated in software. In a particular embodiment, switching device 210 operates to support virtual port addressing on macroflow sub-plane 212, on microflow sub-plane 214, or on both, as needed or desired.

Macroflow sub-plane 212 receives and routes data packets 230 and 232. As illustrated, macroflow sub-plane 212 receives both packets 230 and 232. Macroflow sub-plane 212 determines if the data packets are able to be routed based upon the data packet-based rules implemented by packet-based routing table 213. If so, macroflow sub-plane 212 routes the data-packets. For example, data packets 230 represent a group of data packets that can be routed based upon the data packet-based rules, and data packets 230 are shown as transiting switching device 210 through only macroflow sub-plane 212. However, if the data packets are not able to be routed based upon the data packet-based rules implemented by macroflow sub-plane 212, or if the data packets otherwise require further classification based upon a deep packet inspection, the data packets are sent to microflow sub-plane 214, and the microflow sub-plane routes the data packets based upon the flow entries in flow-based routing table 215. For example, data packets 232 represent a group of data packets that cannot be routed based upon the data packet-based rules, and data packets 232 are shown as transiting switching device 210 through both macroflow sub-plane 212 and microflow sub-plane 214.

Data packet 234 represents an unknown data packet. Here, when macroflow sub-plane 212 receives data packet 234, the macroflow sub-plane forwards the data packet via SDN agent 222 to SDN controller 220. SDN controller 200 determines whether data packet 234 represents data associated with a new flow or with a previously evicted flow, as described below, forwards the data packet to microflow sub-plane 214 via SDN agent 224, and modifies the switching paths of the microflow sub-plane such that the microflow sub-plane can recognize and route data packets associated with the new flow. Microflow sub-plane 214 then routes data packet 234. When macroflow sub-plane 212 receives subsequent data packets that are associated with the new flow, the macroflow sub-plane forwards the data packets to microflow sub-plane 214 for routing. In another embodiment of network 200, when macroflow sub-plane 212 receives data packet 234 the macroflow sub-plane forwards the data packet to microflow sub-plane 214, which forwards the data packet via SDN agent 224 to SDN controller 220. SDN controller 200 determines whether data packet 234 represents data associated with a new flow or with a previously expired flow, forwards the data packet to microflow sub-plane 214 via SDN agent 224, and modifies the switching paths of the microflow sub-plane such that the microflow sub-plane can recognize and route data packets associated with the new flow. Microflow sub-plane 214 then routes data packet 234. When macroflow sub-plane 212 receives subsequent data packets that are associated with the new flow, the macroflow sub-plane forwards the data packets to microflow sub-plane 214 for routing.

In a particular embodiment, microflow sub-plane 214 accumulates a large number of flow entries in flow-based routing table 215. As such, microflow sub-plane 214 operates to track the usage of the flow entries that are resident in flow-based routing table 215, to determine when a particular flow is not being utilized often. In this way, when the number of flow entries begins to reach or exceed the capacity of flow-based routing table 215, microflow sub-plane 214 operates to evict stale entries to SDN controller 220. When a flow entry is evicted to SDN controller 220, the SDN controller stores the flow entry to a flow storage device 225. In a particular embodiment, SDN controller 220 includes flow storage device 225. In another embodiment, flow storage device 225 is a separate storage device that is accessible to SDN controller 220. By storing flow entries in flow storage device 225, SDN controller 220 can quickly determine if data packet 234 is associated with a previously evicted flow or if a new flow entry needs to be created for a flow associated with the data packet. If data packet 234 is associated with a previously evicted flow, SDN controller 220 retrieves the flow entry from flow storage device 225 and provides the flow entry to SDN agent 224 for placement in flow-based routing table 215. If data packet 234 is a new flow, SDN controller 220 creates a new flow entry, provides the flow entry to SDN agent 224 for placement in flow-based routing table 215, and stores the flow entry to flow storage device 225.

In a particular embodiment, a group of flow entries are associated together into a flow page of related flow entries, and the group of flow entries is passed between SDN controller 220 and SDN agent 224, and is stored on flow storage device 225 as the flow page. For example, switching device 210 can be included in a network that includes client systems, a mail server, and a network storage device. Here, on a Monday morning, when users of the client systems start working, a data packet that is associated with a user e-mail can be received by switching device 210. Over a weekend, the traffic between the client systems and the mail server may have dropped to the point where flow entries associated with mail traffic may have been evicted from flow-based routing table 215. Here, on a Monday morning, when users of the client systems start working, a first data packet that is associated with a user e-mail can be received by switching device 210. Then, by identifying the data packet with a mail flow, microflow sub-plane 214 can predict that a larger number of data packets that are associated with user e-mail activity are about to be received, and the microflow sub-plane can request to receive a flow page that includes not just the flow entry for the first data packet, but also flow entries associated with e-mail flows for all of the users. Later, say midnight of the next day, the number of e-mail flows may be curtailed, but another data packet that is associated with a back-up operation of a client system on the network storage device can be received by switching device 210. Then, by identifying the data packet with a back-up flow, microflow sub-plane 214 can predict that a larger number of data packets that are associated with client back-up activity are about to be received, and the microflow sub-plane can request to receive a flow page that includes not just the flow entry for the next data packet, but also flow entries associated with other client back-up flows for all of the client systems. In this way, fewer unknown data packets such as data packet 234 will need to be routed to SDN controller 220 for evaluation.

In a particular embodiment, the flow pages are provided to one or more of SDN controller 220, SDN agent 224, or flow storage device 225 by an application that associates the flow entries of a flow page as being identified with that flow page. For example, mail server application can create a unique flow for each user, and can associate all user flows, or a portion of the user flows, with a particular flow page, and can provide the flow page to one or more of SDN controller 220, SDN agent 224, or flow storage device 225, as needed or desired. In another embodiment, SDN controller 220 or SDN agent 224 can perform an analysis on the flows that are seen by microflow sub-plane 214, and can associate the flow entries together into one or more flow pages. For example, by analyzing the usage of flow entries in flow-based routing table 215 for usage frequency, and for associations between flow entry usages, for common source or destination applications, for common users, or other aspects of the flow entries that are subject to analysis to determine various commonalities, SDN controller 220 or SDN agent 224 can associate the flow entries into one or more flow pages, as needed or desired.

In a particular embodiment, data packets that are associated with a particular flow page can be provided with a flow page identification field that associates the data packets with one or more flow pages. In this way, microflow sub-plane 214 can quickly identify that a particular data packet is associated with a flow page, can determine whether or not the identified flow page is resident in flow-based routing table 215, and if not, can request the identified flow page from SDN controller 220. In another embodiment, a flow page can be identified by performing a hash function on various tuples of a data packet, such as an application field of the data packet, a user or recipient of the data packet, other field of the data packet, or a combination thereof.

Figure 3:
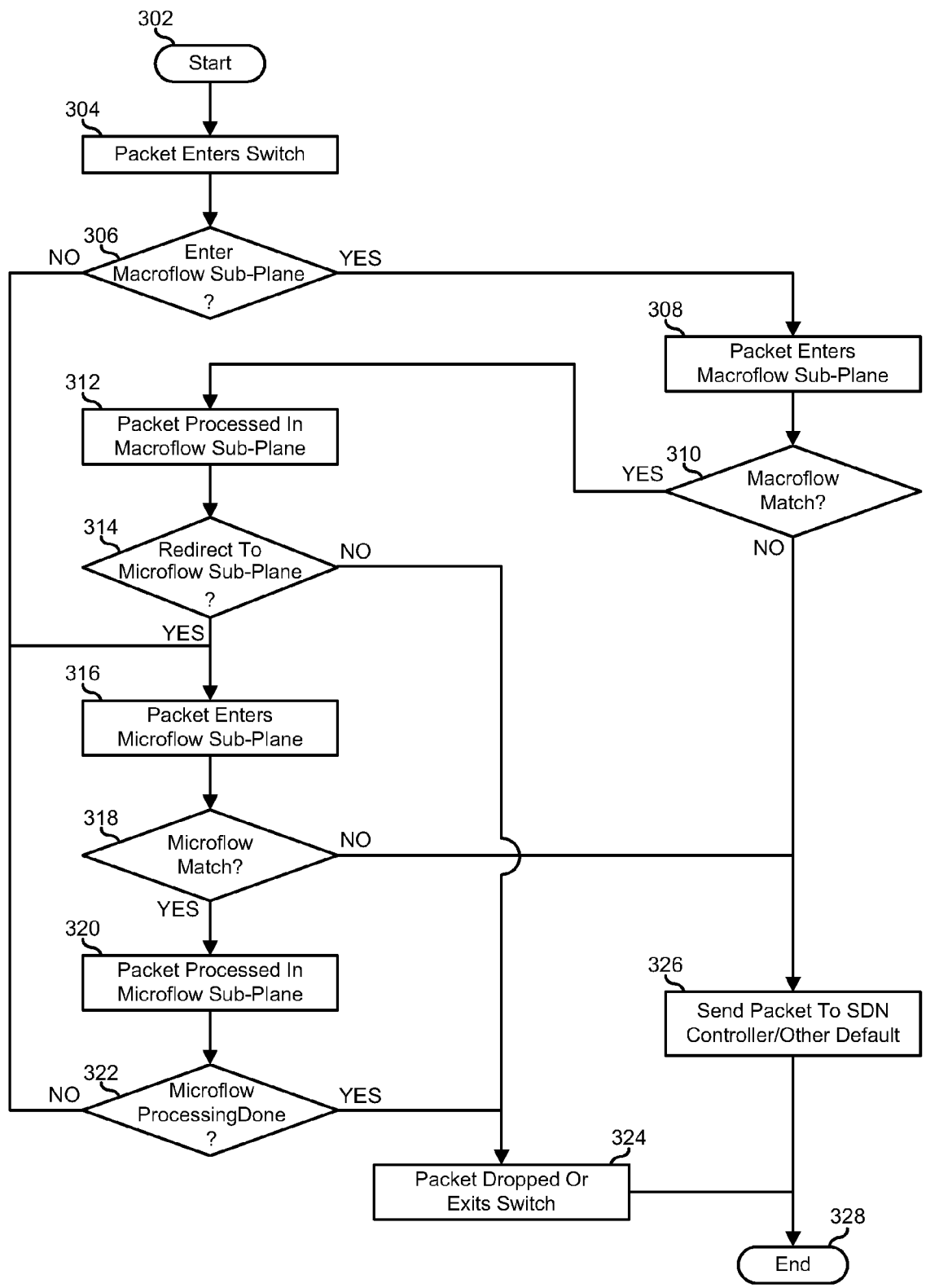
FIG. 3 is a flowchart illustrating a method of providing a split data plane in a flow-based switching device according to an embodiment of the present disclosure.

FIG. 3 illustrates a method of providing a split data plane in a flow-based switching device, starting at block 302. A packet enters a switching device in block 304. For example, a data packet can be received by flow-based switching device 210. A decision is made as to whether or not the packet should enter a macroflow sub-plane in decision block 306. For example, the data packet received by switching device 210 can be routed based upon packet-based routing rules and can thus be determined to be handled by macroflow sub-plane 212, or the packet can be routed based upon flow-based processing and can thus be determined to be handled by macroflow sub-plane 214. In a particular embodiment, decision block 304 can represent a decision that is made by a macroflow sub-plane, and thus the decision of decision block 304 is whether or not the received packet should stay in the macroflow sub-plane. If the packet should not enter the macroflow sub-plane, the "NO" branch of decision block 306 is taken, and the method continues in block 316, as described below.

If it is determined that the packet should enter the macroflow sub-plane, the "YES" branch of decision block 306 is taken, then the packet enters the macroflow sub-plane in block 308, and a decision is made as to whether or not there is a macroflow match in decision block 310. For example, the data packet received by switching device 210 can be inspected to see if a destination MAC address or a destination IP address is currently resident in a routing table associated with macroflow sub-plane 212. If there is not a macroflow match, the "NO" branch of decision block 310 is taken, the packet is sent to the SDN controller or another default action is taken in block 326, and the method ends at block 328. If there is a macroflow match in the macroflow sub-plane, the "YES" branch of decision block 310 is taken, and the packet is processed in the macroflow sub-plane in block 312.

A decision is made as to whether or not the packet is to be redirected from the macroflow sub-plane to the microflow sub-plane in decision block 314. For example, a packet can include a multicast media stream that is subject to processing in both the macroflow sub-plane and the microflow sub-plane, in which case, when the macroflow sub-plane processing is completed, the packet can be redirected to the microflow sub-plane. If the packet is not to be redirected from the macroflow sub-plane to the microflow sub-plane, the "NO" branch of decision block 314 is taken, the packet is dropped or routed to the appropriate exit port in block 324, and the method ends in block 328.

If either the packet should enter the macroflow sub-plane as determined in decision block 306 and the "NO" branch of decision block 306 is taken, or if the packet is to be redirected from the macroflow sub-plane to the microflow sub-plane as determined in decision block 314 and the "YES" branch of decision block 314 is taken, then the packet enters the microflow sub-plane in block 316. A decision is made as to whether or not there is a microflow match in decision block 318. For example, the data packet received by switching device 210 can be deep packet inspected to see if a tuple match resides in a routing table associated with microflow sub-plane 214. If there is not a microflow match, the "NO" branch of decision block 318 is taken, the packet is sent to the SDN controller or another default action is taken in block 326, and the method ends at block 328. If there is a microflow match in the microflow sub-plane, the "YES" branch of decision block 318 is taken, and the packet is processed in the microflow sub-plane in block 320. A decision is made as to whether or not the microflow processing is done in decision block 322. For example, a packet can be include a multicast media stream that is subject to processing in multiple microflow sub-planes, in which case, when the first microflow sub-plane processing is completed, the packet can be redirected to another microflow sub-plane. If the microflow processing is not done, the "NO" branch of decision block 322 is taken, and the method returns to block 316 where the packet enters another microflow sub-plane. If the microflow processing is done, the "YES" branch of decision block 322 is taken, the packet is dropped or routed to the appropriate exit port in block 324, and the method ends in block 328

Figure 4:
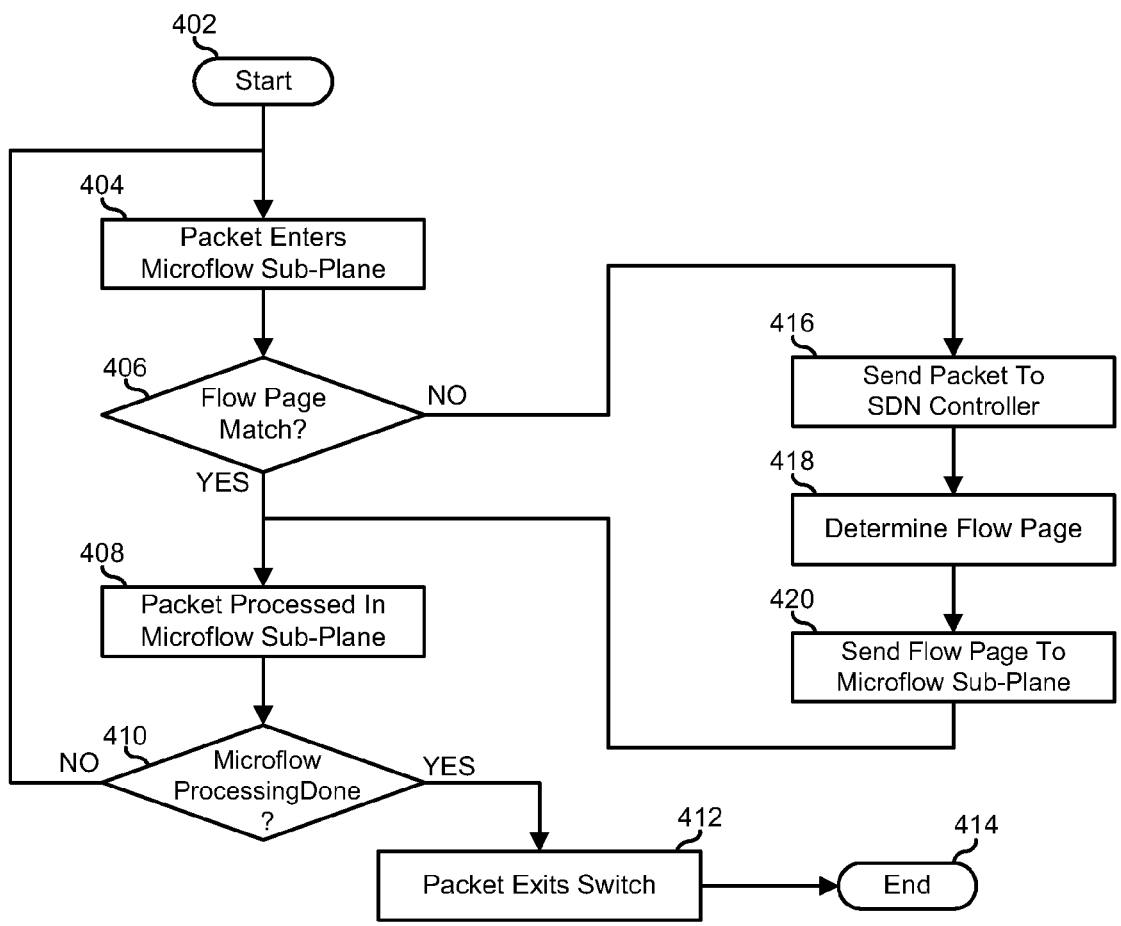
FIG. 4 is a flowchart illustrating a method of handling flow pages in a flow-based switching device according to an embodiment of the present disclosure.

FIG. 4 illustrates a method of handling flow pages in a flow-based switching device, starting at block 402. A data packet enters a microflow sub-plane of a flow based switching device in block 404. For example, data packet 236 can be sent from macroflow sub-plane 212 to microflow sub-plane 214. A determination is made as to whether or not the data packet matches a flow page that is resident in a flow-based routing table in decision block 406. If so, the "YES" branch of decision block 406 is taken, and the data packet is processed in the microflow sub-plane in block 408. A decision is made as to whether or not the processing of microflows is done in decision block 410. If not, the "NO" branch of decision block 410 is taken, and the method returns to block 404 where another data packet enters the microflow sub-plane. If the processing of microflows is done, The "YES" branch of decision block 410 is taken, the data packet is routed to its destination and exits the switch in block 412, and the method ends in block 414.

Figure 5:
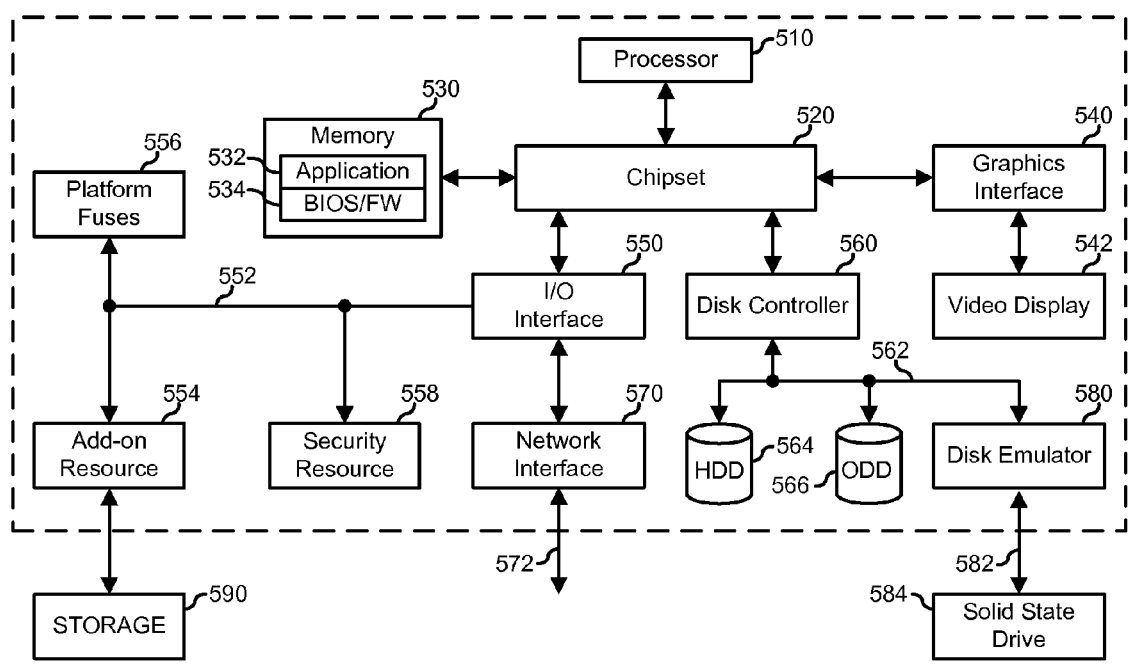
FIG. 5 is a block diagram illustrating an information handling system according to an embodiment of the present disclosure.

Returning to decision block 406, if the data packet does not match a flow page that is resident in the flow-based routing table, the "NO" branch of the decision block is taken, and the data packet it sent to an SDN controller for evaluation in block 416. For example, data packet 236 can be forwarded via SDN agent 224 to SDN controller 220. The SDN controller determines a flow page associated with the data packet in block 418. For example, SDN controller 220 can determine that flow storage device 225 includes a flow page associated with the data packet. The data packet and the flow page are sent to the microflow sub-plane in block 420, and the method returns to block 408 where the data packet is processed in the microflow sub-plane FIG. 5 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment, information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network switching device comprising:
a macroflow sub-plane that performs packet-based routing in the network switching device based upon an identity of a first port that receives data packets and an identity of a second port to which the data packet are to be forwarded, as determined by a header of the data packets, the macroflow sub-plane configured to:
receive a first data packet; and
determine that the first data packet is not to be routed based upon the packet-based routing; and
a microflow routing sub-plane that performs flow-based routing in the network switching device based upon a flow identity associated with the data packets, the microflow routing sub-plane configured to:
receive the first data packet from the macroflow sub-plane;
determine that the first data packet is associated with an unknown flow entry;
send the first data packet to a software defined network (SDN) controller in response to determining that the first data packet is associated with the unknown flow entry; and
receive, from the SUN controller, a first flow page including a first plurality of flow entries in response to sending the first data packet.

2. The network switching device of claim 1, wherein the microflow routing sub-plane is further configured to:
load the first plurality of flow entries to the flow table; and
route the first data packet based upon a first flow entry of the first plurality of flow entries.

3. The network switching device of claim 2, wherein the microflow routing sub-plane is further configured to:
receive a second data packet after the first plurality of flow entries is loaded to the flow table;
determine that the second data packet is associated with a second flow entry;
determine that the second flow entry is associated with the first flow page; and
route the second data packet based upon the second flow entry.

4. The network switching device of claim 2, wherein the microflow routing sub-plane is further configured to:
receive a second data packet;
determine that the second data packet is associated with a second flow entry;
determine that the second flow entry is associated with a second flow page, wherein the second flow page comprises a second plurality of flow entries including the second flow entry;
determine that the second flow page is not resident in the routing table;
request the second flow page from the SDN controller; and
receive the second plurality of flow entries in response to requesting the second flow page;
evict a third flow page from the routing table; and
load the second plurality of flow entries to the flow table.

5. The network switching device of claim 4, wherein the microflow routing sub-plane is further configured to:
route the second data packet based upon the second flow entry.

6. The network switching device of claim 1, wherein, in determining that the first data packet is associated with the first flow entry, the microflow routing sub-plane is further configured to:
read a flow identifier from the first data packet, the flow identifier identifying the first flow entry.

7. The network switching device of claim 1, wherein, in determining that the first data packet is associated with the first flow page, the microflow routing sub-plane is further configured to:
calculate a flow identifier from the first data packet, the flow identifier identifying the first flow entry.

8. The network switching device of claim 7, wherein, in calculating the flow identifier, the microflow routing sub-plane is further configured to:
determine a hash of the first data packet based upon a tuple of the first data packet; and
identify the flow identifier from the hash of the first data packet.

9. A method comprising:
receiving a first packet at a macroflow sub-plane of a network switching device, wherein the macroflow sub-plane routes data packets based upon an identity of a first port that receives the data packets and an identity of a second port to which the data packet are to be forwarded, as determined by a header of the data packets;
sending the first packet to a microflow routing sub-plane of the network switching device, wherein the microflow sub-plane routes the data packets based upon a flow identity associated with the data packets;
determining that the first data packet is associated with an unknown flow entry;
sending the first data packet to a software defined network (SDN) controller in response to determining that the first data packet is associated with the unknown flow entry; and
receiving, from the SDN controller, a first flow page including a first plurality of flow entries in response to sending the first data packet.

10. The method of claim 9, further comprising:
loading the first plurality of flow entries to the flow table; and
routing, by the microflow sub-plane, the first data packet based upon a first flow entry of the first plurality of flow entries.

11. The method of claim 10, further comprising:
receiving a second data packet after the first plurality of flow entries is loaded to the flow table;
determining that the second data packet is associated with a second flow entry;
determining that the second flow entry is associated with the first flow page; and
routing, by the microflow sub-plane, the second data packet based upon the second flow entry.

12. The method of claim 10, further comprising:
receiving a second packet at the macroflow sub-plane;
sending the second packet to the microflow routing sub-plane;
determining that the second data packet is associated with a second flow entry;
determining that the second flow entry is associated with a second flow page, wherein the second flow page comprises a second plurality of flow entries including the second flow entry;
determining that the second flow page is not resident in the routing table;
requesting the second flow page from the SDN controller;
receiving the second plurality of flow entries in response to requesting the second flow page;
evicting a third flow page from the routing table; and
loading the second plurality of flow entries to the flow table.

13. The method of claim 11, further comprising:
routing, by the microflow sub-plane, the second data packet based upon the second flow entry.

14. The method of claim 9, wherein, in determining that the first data packet is associated with the first flow entry, the method further comprises:
reading a flow identifier from the first data packet, the flow identifier identifying the first flow entry.

15. The method of claim 9, wherein, in determining that the first data packet is associated with the first flow entry, the method further comprises:
calculating a flow identifier from the first data packet, the flow identifier identifying the first flow entry.

16. The method of claim 15, wherein, in calculating the flow identifier, the method further comprises:
determining a hash of the first data packet based upon a tuple of the first data packet; and
identifying the flow identifier from the hash of the first data packet.

17. A non-transitory computer-readable medium including code for performing a method, the method comprising:
receiving a first packet at a macroflow sub-plane of a network switching device, wherein the macroflow sub-plane routes data packets based upon an identity of a first port that receives the data packets and an identity of a second port to which the data packet are to be forwarded, as determined by a header of the data packets;
sending the first packet to a microflow routing sub-plane of the network switching device, wherein the microflow sub-plane routes the data packets based upon a flow identity associated with the data packets;
determining that the first data packet is associated with an unknown flow entry;
sending the first data packet to a software defined network (SDN) controller in response to determining that the first data packet is associated with the unknown flow entry, and
receiving, from the SDN controller, a first flow page including a first plurality of flow entries from the SDN controller in response to sending the first data packet;
loading the first flow page to the flow table; and
routing, by the microflow sub-plane, the first data packet based upon a first flow entry of the first plurality of flow entries.

18. The computer-readable medium of claim 17, the method further comprising:
receiving a second packet at the macroflow sub-plane;
sending the second packet to the microflow routing sub-plane;
determining that the second data packet is associated with a second flow entry;
determining that the second flow entry is associated with a second flow page, wherein the second flow page comprises a second plurality of flow entries including the second flow entry;
determining that the second flow page is not resident in the routing table;
requesting the second flow page from the SDN controller;
receiving the second plurality of flow entries in response to requesting the second flow page;
evicting the first flow page from the routing table;
receiving a third flow page from the SDN controller;
loading the second plurality of flow entries to the flow table; and
routing, by the microflow sub-plane, the second data packet based upon the second flow entry.

19. The computer-readable medium of claim 17, wherein, in determining that the first data packet is associated with the first flow entry, the method further comprises:
reading a flow identifier from the first data packet, the flow identifier identifying the first flow entry.

20. The computer-readable medium of claim 17, wherein, in determining that the first data packet is associated with the first flow entry, the method further comprises:
calculating a flow identifier from the first data packet, the flow identifier identifying the first flow entry.

* * * * *

UNITED STATES PATENT AND TRADEMARK OFFICE
CERTIFICATE OF CORRECTION

| | | |
|---|---|---|
| PATENT NO. | : 9,641,428 B2 | Page 1 of 1 |
| APPLICATION NO. | : 13/850004 | |
| DATED | : May 2, 2017 | |
| INVENTOR(S) | : Rajesh Narayanan et al. | |

It is certified that error appears in the above-identified patent and that said Letters Patent is hereby corrected as shown below:

In the Claims

Column 13, Claim 1, Lines 56-58, change:
"receive, from the SUN controller, a first flow page including a first plurality of flow entries in response to sending the first data packet"

To:
--receive, from the SDN controller, a first flow page including a first plurality of flow entries in response to sending the first data packet--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*